United States Patent Office 3,738,959
Patented June 12, 1973

3,738,959
FLAME-RETARDED OLEFIN POLYMER
COMPOSITIONS
Christos Savides, Piscataway, and Peter Vincent Susi, Middlesex, N.J., assignors to American Cyanamid Company, Stamford, Conn.
No Drawing. Filed May 22, 1972, Ser. No. 255,493
Int. Cl. C08f 45/60
U.S. Cl. 260—45.75                                10 Claims

ABSTRACT OF THE DISCLOSURE

Flame-retarded compositions comprising an olefin polymer having incorporated therein (1) ethylenebis[tris(2-cyanoethyl)]phosphonium bromide, (2) ammonium polyphosphate, (3) titanium dioxide or silicon dioxide and (4) a compound having an —Si— linkage therein, are disclosed.

BACKGROUND OF THE INVENTION

The production of resin compositions which are flame-retarded is becoming increasingly more commercially important in that more and more castings, laminated articles, molding etc. which are used in the home are being manufactured of plastic material. These articles are required to be resistant to fire and possess the ability to endure high temperatures without deterioration. Typical applications of such compositions include castings for live electrical contacts; structural members such as pipes, wall coverings, wall paneling; items such as ash trays, waste containers, fibers and the like.

Of increasing importance in regard to these flame-retarded compositions is the requirement that they be "non-dripping" in addition to flame-proof. That is to say, the compositions, although they may burn and extinguish themselves, should not burn and drip burning material onto a second surface which itself could ignite and thereby allow the fire to continue.

One class of compositions which have been found to be effective flame-retardants, not only from the standpoints of minimizing the flammability of polymers to which they are added, but also from the standpoint of preventing the dripping of any burning material, is disclosed and claimed in U.S. Pat. No. 3,649,591, which patent is hereby incorporated herein by reference.

The compositions of the above-identified patent comprise (I) a mixture of various phosphonium halides and ammonium polyphosphate and (II) various oxides and carbonates of such elements as titanium and silicon. While these compositions have been found unusually effective when added to olefin polymers, particularly with respect to the prevention of the dripping thereof, they suffer from one deficiency which is particularly detrimental to the use of the ultimate flame-retarded polymer compositions. This deficiency resides in the tendency of the flame-retarded additive mixture to leach out or be extracted from the polymer on exposure thereof to water. The loss of the flame-retarding additive therefore contributes to a significant loss of flame-retardancy in the polymer, thereby severely limiting the utility of the ultimate system. Since many olefin polymer based compositions are used in the production of articles which are subject to contact with water, such as, for example, dish water and clothes washer components, polyolefin monofilaments etc., the retention of the flame-retarded additives therein is of considerable importance.

SUMMARY

We have now found that the problem of the extraction of the flame-retarded additives of the above-mentioned patent from olefin polymers when contacting them with water can be overcome by the addition of a small but effective amount of a compound having the formula (I) 

wherein R is an alkyl radical of 1–8 carbon atoms, an aryl radical of 6–10 carbon atoms, an aralkyl radical of 7–11 carbon atoms, an acyloxy radical of 2–4 carbon atoms or an alkenyl radical of 2–4 carbon atoms, R' is an alkoxy radical of 1–8 carbon atoms or an acetoxy radical and $n$ is a whole positive integer of 1–3, inclusive, or the formula (II) 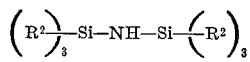

wherein $R^2$ is an alkyl radical of 1–8 carbon atoms.

The use of the compounds of Formulae I and II in conjunction with the phosphonium bromide-ammonium polyphosphate-titanium or silicon dioxide flame-retarded compositions provides improved resistance to water-extraction of the flame-retardant while not significantly interfering with the ability of the flame-retarded mixture to function in the olefin polymer.

DESCRIPTION OF THE INVENTION INCLUDING PREFERRED EMBODIMENTS

As mentioned above, it has now been discovered that the addition of small but effective amounts of various silanes conforming to Formulae I and II significantly reduces leaching and hot water extractability of olefin polymers containing a flame-retarding amount of a mixture of ethylenebis[tris(2-cyanoethyl)]phosphonium bromide, ammonium polyphosphate and titanium or silicon dioxide.

The silanes represented by Formulae I and II are well known in the art as are methods for their production, as exemplified by U.S. Pat. No. 3,207,623; Paul F. Bruins; Journal of Applied Polymer Science; Applied Polymer Symposi No. 14; Silicone Technology; Interscience Publishers; New York; 1970, which references are also hereby incorporated herein by reference.

The silane of preference is triacetoxyvinylsilane, however, others such as methyltrimethoxysilane, acryloxytrimethoxysilane, ethyltrimethoxysilane, methacryloxytrimethoxysilane, butyltrimethoxysilane, tribenzylethoxysilane, octyltrimethoxysilane, phenyltrimethoxysilane, p-methylphenyltrimethoxysilane, diphenyldimethoxysilane, trimethoxypropenylsilane, hexamethyldisilazane, hexaoctyldisilazane, trimethylacetoxysilane, dioctyldiacetoxysilane, trinaphthyloctyloxysilane, 2-methylnaphthyltrimethoxysilane, di - 6 - octenyldiacetoxysilane, triacetoxyphenethylsilane, and the like.

The silane of Formula I and/or II can be incorporated into the olefin polymer in any manner without detracting from the scope of the instant invention. For example, the silane can be incorporated into the polymer before or after the three-component flame-retarded composition. Similarly, the silane can be added to the three-component flame-retarded composition before compounding the entire additive combination into the polymer. Additionally, any component or combination of components of the three-component flame-retardant can be blended, treated, contacted, embedded in etc. with the silane before compounding with the remaining flame-retardant components or the polymer.

The silane can be added to the olefin polymer in a small but effective amount, the particular amount employed not being necessarily within the limits of a particular concentration range. It has generally been found that amounts of at least about 0.5%, generally from about 0.75% to about 1.5%, by weight, based on the weight of the polymer are sufficient.

The individual components of our novel compositions may be compounded such as by milling them on, for example, a two-roll mill, in a Banbury mixer etc., molding the components simultaneously, extruding the components simultaneously, blending the components in liquid or powder form, or during the polymer formation provided the ingredients are inert to each other and to the materials utilized during the polymerization.

The flame-retardant compositions are generally composed of from about 5% to about 25%, by weight, based on the weight of the olefin polymer, of a mixture of ethylenebis[tris(2-cyanoethyl)]phosphonium bromide and an ammonium polyphosphate, the ratio of bromide: polyphosphate ranging from about 2:1 to about 1:2, respectively.

The concentration of titanium dioxide, silicon dioxide or mixtures thereof employed range from about 0.25% to about 5.0%, by weight, also based on the weight of the olefin polymer.

The olefin polymers useful herein include the homopolymers of ethylene and propylene and copolymers of propylene and ethylene with one another and with an olefin comonomers which possess from 2-4 carbon atoms, inclusive, such as butylene, isobutylene etc., the copolymers containing from about 50-90% of ethylene or propylene, by weight.

It is also within the scope of the instant invention to incorporate such additives as plasticizers, UV absorbers, dyes, pigments, heat and light stabilizers, antioxidants, lubricants, antistatic agents and the like into our novel composition.

The following examples are set forth for purposes of illustration only and are not to be construed as limitations on the present invention except as set forth in the appended claims. All parts and percentages are by weight unless otherwise specified. The ammonium polyphosphate used was a commercially available material having a phosphonium weight percent of 32 and an ammoniacal nitrogen to phosphorus molar ratio of .92.

Example 1

A dry blend of polypropylene containing pentaerythrityl, tetra(3,5 - di - t - butyl - 4 - hydroxyphenylpropionate (a hindered phenol and anti-oxidant), distearyl thiodipropionate (a secondary stabilizer) and 20% of a mixture of 10 parts of ethylenebis[tris(2-cyanoethyl)] phosphonium bromide, 10 parts of ammonium polyphosphate and 1.0 part of titanium dioxide is extruded at 400–450° C. through a tubular die. The extrudate is quenched in a water bath and then pelletized. Similar blends are then prepared except that 0.75% and 1.0% of triacetoxyvinylsilane are added to two samples and the resultant mixtures are extruded, as above. Results of the extrusion are set forth in Table I, following.

TABLE I

| Example | Percent silane | Degree of flame—retardant leaching |
| --- | --- | --- |
| 1–A | 0.0 | Severe. |
| 1–B | 0.75 | Slight. |
| 1–C | 1.0 | None. |

The pellets of Examples 1–A and 1–C are each then injection molded into two bars 5" x 0.5" x 0.25". One bar of each example is tested and rated for flammability according to UL Test Subject 94. The remaining two bars are then extracted according to the procedure described in UL Subject 746, Section E–6 whereby they are immersed in 1000 mil of water at 70° C. for 7 days, replacing the water every 24 hours during the first 5 days. Flammability is then determined on the extracted bars according to UL Test Subject 94. The results are set forth in Table II, below.

TABLE II

| | UL 94 rating | |
| --- | --- | --- |
| Example | Before extraction | After extraction |
| 1–A | SE–I | FB |
| 1–C | SE–I | SE–II |

Note.—SE–I Self-extinguishing/non-dripping; FB Free-burning; SE–II= Self-extinguishing/dripping.

Example 2

A dry blend of 20 parts of a mixture of 10 parts of ethylenebis[tris(2-cyanoethyl]phosphonium bromide, 10 parts of ammonium polyphosphate, 1.0 part of titanium and 1.0 part of silica dioxide and 1.0 part of hexamethyldisilazane are incorporated by extrusion into 80 parts of polypropylene. The extrudate is quenched and pelletized as described in Example 1 and the resultant pellets are molded into bars. The bars are tested for extractability and flammability as described in said example. Before extraction, the bars have a UL 94 rating of SE–I. After extraction, the UL 94 rating is SE–I/SE–II.

Following the procedure of Example 1, various silanes represented by either Formula I or Formula II, above, are incorporated into a propylene polymer in the amounts indicated. The same phosphonium bromide and ammonium polyphosphate was used. All other variables were held constant. The results are set forth in Table IV, below.

TABLE IV

| | Silane | | | | | Percent silane |
| --- | --- | --- | --- | --- | --- | --- |
| Ex. | R | R¹ | R² | n | Polymer | |
| 3 | Methyl | Ethoxy | | 1 | Polypropylene | 0.60 |
| 4 | Butyl | Acetoxy | | 1 | do | 0.60 |
| 5 | Octyl | do | | 1 | Polyethylene | 0.60 |
| 6 | Phenyl | do | | 2 | do | 0.75 |
| 7 | p-Methylphenyl | Methoxy | | 2 | do | 1.0 |
| 8 | Naphthyl | do | | 2 | Polypropylene | 1.0 |
| 9 | Benzyl | do | | 1 | do | 1.0 |
| 10 | Phenethyl | do | | 3 | do | 1.0 |
| 11 | Butenyl-1 | do | Methyl * | 2 | Ethylene/propylene copolymer (20/80) | 1.5 |
| 12 | Methacryloxy | do | | 1 | do | 1.5 |
| 13 | Acryloxy | do | | 1 | do | 1.5 |
| 14 | Methyl | Butoxy | | 3 | do | 0.75 |
| 15 | | | Ethyl | | do | 1.0 |
| 16 | | | Propyl | | Polypropylene | 1.0 |
| 17 | | | Butyl | | do | 0.75 |
| 18 | | | Octyl | | Polyethylene | 0.55 |

* Mixture.

In each of Examples 3–18, the samples produced are rated SE–I according to UL Test Subject 94 before extraction according to UL Subject 746, Section E–6. After extraction, each sample is rated SE–II. When samples are produced omitting the silanes of Examples 3–18, the ratings thereof fall from SE–I to FB after extraction.

We claim:

1. A composition of matter comprising α-olefin polymer having incorporated therein (A) from about 5% to about 25%, by weight, of a mixture of ethylenebis[tris(2-cyanoethyl)]phosphonium bromide and an ammonium polyphosphate in a weight ratio of from about 1:2 to 2:1, respectively, (B) from about 0.25% to about 5.0%, by weight, of titanium dioxide, silicon dioxide or mixtures thereof and (C) from about 0.5% to about 1.5%, by weight, said percentages being based on the weight of said polymer, of a compound having the formula (I) $R_n\text{—Si—}(R^1)_{4-n}$ wherein R is an alkyl, aryl, aralkyl, acyloxy or alkenyl radical, $R^1$ is an alkoxy or acetoxy radical and $n$ is a whole integer of 1–3, inclusive or (II) 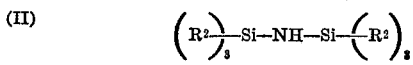

wherein $R^2$ is an alkyl radical.

2. A composition according to claim 1 wherein said α-olefin polymer is polypropylene.

3. A composition according to claim 1 wherein said R is a vinyl radical, said $R^1$ is an acetoxy radical and $n$ is 1.

4. A composition according to claim 1 wherein (B) is titanium dioxide.

5. A composition according to claim 1 wherein (B) is silicon dioxide.

6. A composition according to claim 1 wherein $R^2$ is a methyl radical.

7. A composition according to claim 1 wherein said α-olefin polymer is polypropylene, said R is a vinyl radical, said $R^1$ is an acetoxy radical, $n$ is 1 and (B) is titanium dioxide.

8. A composition according to claim 1 wherein said α-olefin polymer is polypropylene, said $R^2$ is a methyl radical and (B) is silicon dioxide.

9. A composition according to claim 1 wherein (B) is a mixture of titanium dioxide and silicon dioxide.

10. A composition according to claim 1 wherein (B) is a mixture of titanium dioxide and silicon dioxide and $R^2$ is a methyl radical.

References Cited

UNITED STATES PATENTS

| 3,649,591 | 3/1972 | Murray et al. | 106—15 FP |
| 3,100,753 | 8/1963 | Spencer | 260—45.7 R |
| 3,207,623 | 9/1965 | Maryocci et al. | 117—126 GB |

DONALD E. CZAJA, Primary Examiner

M. J. WELSH, Assistant Examiner

U.S. Cl. X.R.

260—45.7 R, 45.9 R, 94.9 R, 94.9 GD